March 9, 1948.　　　　P. C. McLEMORE　　　　2,437,397
DELINTING COTTON SEED
Filed Sept. 13, 1944　　　　3 Sheets-Sheet 1

INVENTOR.
Price C. McLemore,
BY
Brown, Jackson, Boettcher & Dienner
Attys.

Patented Mar. 9, 1948

2,437,397

UNITED STATES PATENT OFFICE 2,437,397

DELINTING COTTON SEED

Price C. McLemore, Montgomery, Ala., assignor to Delinted Seed Company, a corporation of Delaware Application September 13, 1944, Serial No. 553,820

5 Claims. (Cl. 47—58)

The present invention relates to an improved method of and apparatus for delinting cotton seed.

One prior method of delinting cotton seed has been to subject the seed to the action of an acid which will remove a substantial part of the lint from the seed hull. This process requires expensive and bulky equipment, in addition to expert operators, and is beyond the economic feasibility of the average community or farmer. This acid process also has the additional disadvantage of affecting the germination of the treated seed. The germination of acid delinted seed is very poor and, in some instances, where not rigidly or accurately controlled, destroys the entire germination of the seed.

Another prior method of delinting cotton seed is known as "gin delinting," and consists in subjecting the cotton seed to a re-ginning after the seed has passed through an ordinary cotton gin. The gin delinter is very similar to the ordinary cotton gin except that it has approximately 50% to 75% more saws than the ordinary cotton gin. In practicing this method, it is extremely difficult to remove all of the lint without cracking the seed, which destroys the germination. If the seeds are not ginned entirely clean, sufficient lint remains on the seeds to cause them to intertwine and adhere together. This process is also relatively expensive, and the cost of the equipment is normally out of the reach of the average farmer.

Another prior method of delinting cotton seed has been to subject the seed to the action of blasts of flame or other corresponding high temperature heating for the purpose of burning the lint from the seed. These prior burning methods have been objectionable either because of complications of equipment and operation, or because of the likelihood of overheating the seed and destroying its germination or scorching the seed hulls and rendering them brittle.

The general object of the present invention is to avoid the above described objections to these prior methods, and to provide an improved method and apparatus which will remove the lint from the seed more effectively and which will be within the economic range of the average cotton community or large scale cotton grower.

According to this improved method, I first wet the cotton seed and lint with an inflammable liquid such as gasoline, alcohol or the like, and then, while the lint is still wet with this liquid, I ignite the moist lint so that it burns with a very quick combustion of short time interval. This quick burning or flash ignition removes most of the lint very effectively from the seed hull but does not cause overheating of the hull. Hence, this flash burning does not impair germination of the seed nor scorch the hull and render it brittle, such as is very likely to occur when blasts of high temperature flame are brought to bear against the seed hulls or where the hulls are moved slowly over a high temperature surface, as typical of prior art methods.

Another important advantage of first wetting the entire seed with an inflammable liquid and then flash burning the wet lint is that the lint on the top, bottom and all sides of the seed is effectively burned. Because of the high inflammability of the gasoline, alcohol or other liquid used, the flame is self-propagating practically instantaneously around all sides of the seed so that the lint is burned from the bottom of the seed just as effectively as from the top. This avoids the uneven action of a flame brought to bear against the tops or sides of the seeds, or the uneven action resulting from sliding the seeds over a heated surface.

Referring to the accompanying drawings in which I have illustrated one preferred form of apparatus for carrying out my invention:

Figure 1:
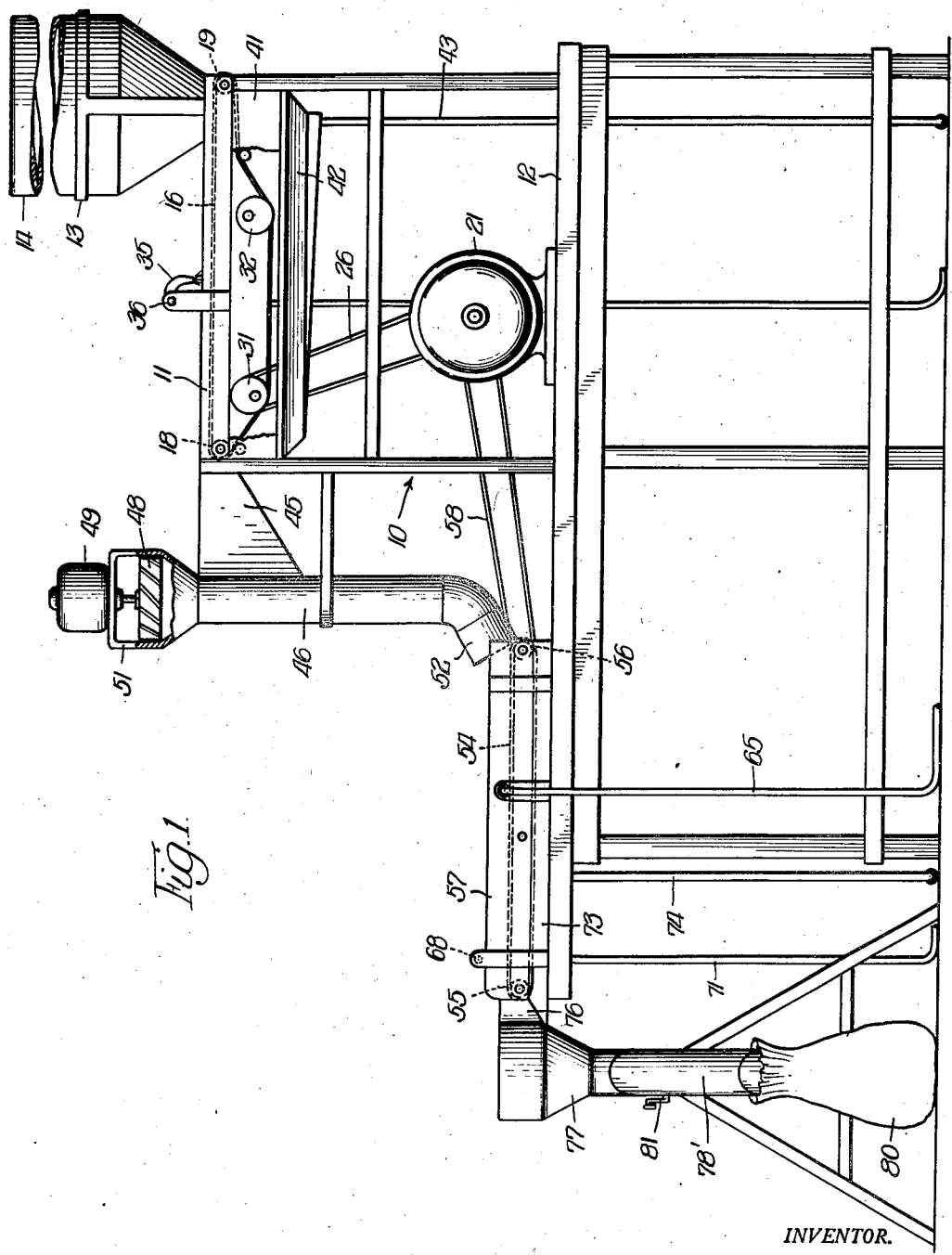
Figure 1 is a side elevational view of the improved machine.
Figure 2:
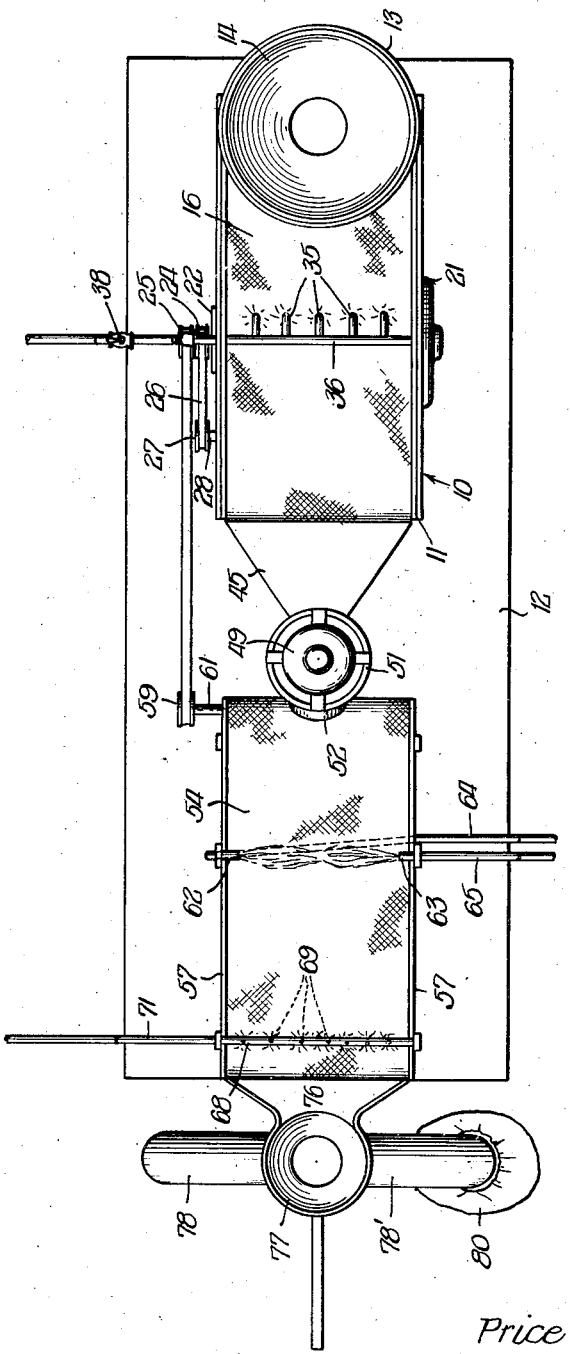
Figure 2 is a plan view thereof.

The various operating parts of the machine are mounted on a suitable supporting frame 10 comprising an upper platform level 11 and a lower platform level 12. Extending upwardly from the right hand end of the upper platform level 11 is a supporting hoop 13 in which is mounted the cotton seed hopper 14. The cotton seed is supplied to the machine by dumping it into the receiving hopper 14. The lower end of the hopper discharges the cotton seed upon the right hand end of an endless conveyor belt 16 (Figure 2) which conveys the seed toward the left along the upper platform level 12. This conveyor belt is preferably composed of wire screen or other mesh material which will convey the cotton seeds without allowing the seeds to become caught in the mesh. This screen belt passes around end rollers 18 and 19 which are suitably journaled in the upper platform frame 11. The conveyor belt is shown as being driven from an electric motor 21 mounted either on the lower platform level 12 or on any other appropriate support. A suitable speed reducing unit 22 (partly shown in Figure 2)

is connected with the shaft of the motor 21 and serves to transmit a reduced speed drive to the two driving sheaves 24 and 25 shown in Figure 2. The sheave 24 is operatively connected through a belt 26 with a sheave 27 mounted on the end of a drive shaft 28 which serves to drive the conveyor belt 16. The shaft 28 may be chain connected or belt connected with either or both of the end rollers 18 and 19. As an alternative arrangement, the shaft 28 may be arranged to drive an eccentrically mounted driving roller 31. The purpose of such an arrangement would be to impart an irregular or jerking travel to the screen conveyor 16 for the purpose of tumbling or turning the cotton seeds over and over and also of distributing the cotton seeds over a greater area of the screen by a jerking motion in the travel of the screen. Another eccentrically mounted roller 32 may also be arranged along the bottom run of the conveyor belt with its eccentricity opposite to that of the roller 31 for accommodating the eccentricity of the roller 31, this second roller being either power driven or a mere idler roller. Said second roller 32 is not necessary because the eccentric motion of the first roller 31 can be accommodated by the inherent elasticity of the belt, or by a spring tension roller adapted to maintain the belt taut. Various other well known methods may be employed for vibrating or shaking the belt to distribute the seed over its surface, such arrangements being old and well known.

Figure 3:
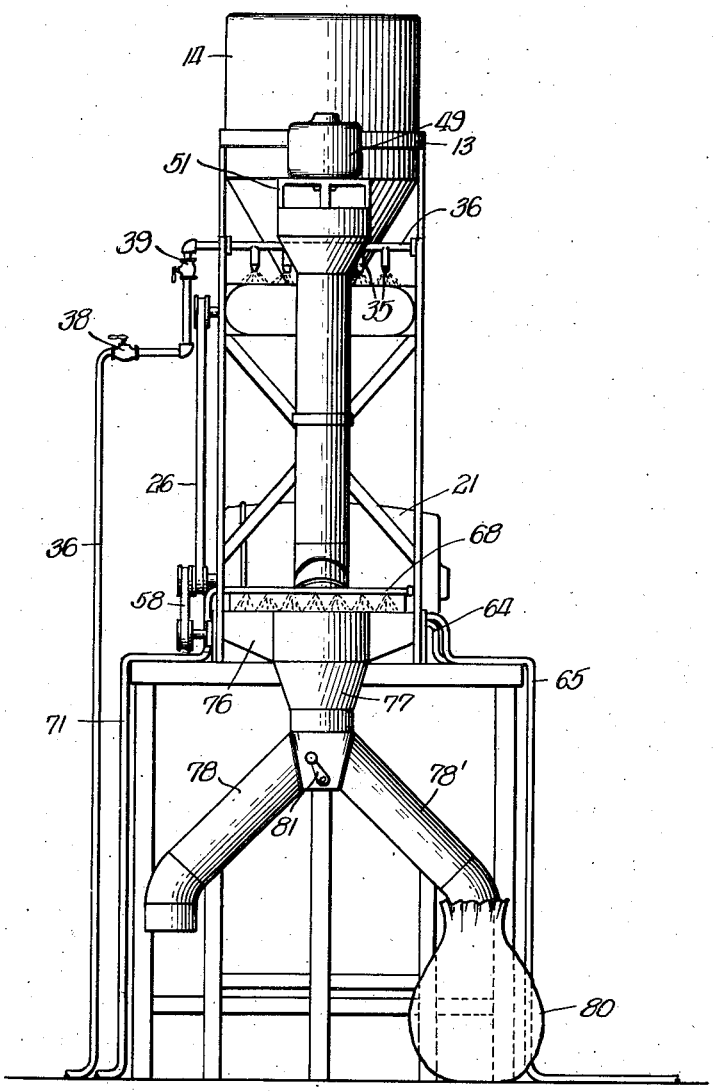
Figure 3 is an end elevational view of the machine as viewed from the left hand end of Figure 1.

The highly inflammable liquid is sprayed on the seed hulls while they are traveling toward the left along the upper run of the screen conveyor 16. This spraying is performed through a plurality of spray nozzles 35 which project downwardly from the transverse supply pipe 36 extending across the top of the conveyor. As shown in Figure 3, the supply pipe 36 is extended to any suitable source of liquid fuel supply, and has control valves 38 and 39 interposed therein for controlling the volume of fuel discharged from the spray nozzles and for shutting off the supply. I preferably use gasoline as this liquid fuel so as to obtain a very rapid flash ignition of the lint on the cotton seed, but other combustible liquids can be used, such as alcohol, ether compounds, etc. The lower run of the screen conveyor belt 16 may be housed in, if desired, by an enclosing casing 41 which extends down from the upper frame 11 around the sides and ends, this enclosing housing having a bottom pan or trough 42 which collects any of the liquid fuel which may pass down through or around the upper and lower runs of the belt. A return pipe 43 may be extended down from this collecting pan 42 for returning the excess fuel back to a point of supply or back to the pressure pump. Any suitable straining screens may be interposed in this return pipe 43. Instead of using a conveyor belt 16 composed of wire mesh, the invention also contemplates the use of a belt composed of webbing, textile, leather, rubber or other suitable material for holding the sprayed liquid fuel on the upper run of the belt so that this liquid fuel will thoroughly wet the under sides of the cotton seeds lying on the belt. In the erection of this type of machine, the machine is either erected outdoors or suitable precautions are taken to prevent the collection of inflammable fumes which might otherwise establish a dangerous condition near the machine.

After all of the lint on the cotton seeds and after all the exterior surfaces of the hulls have been thoroughly wetted with the inflammable liquid, such as gasoline, the seeds are discharged from the left hand end of the conveyor belt 16 into a chute 45 which leads down and opens into an air blast duct 46 extending downwardly to the lower table level 12. A stream of air is forced downwardly through the duct 46 by a fan or blower discharging into the upper end of the duct. In the exemplary arrangement illustrated, a fan 48 is arranged to force a high velocity stream of air down into the upper end of the duct, this fan being driven by an electric motor 49 which is mounted on an open spider frame 51 extending upwardly from the open top of the duct. The lower end of the duct 46 is provided with a discharge outlet 52 which discharges laterally out over the top run of another conveyor 54 on which the flash burning takes place. The stream of air impelled downwardly by the fan 48 has a velocity down through the duct 46 or through the duct outlet 52 which is in excess of the velocity of flame propagation under conditions such as have been described, and hence flame cannot pass back up through the duct 46 for igniting the seeds on the spray conveyor 16.

The lower conveyor 54, on which burning and quenching take place, is also preferably composed of fine mesh wire screen or like material. This conveyor passes around end rollers 55 and 56 journaled at the ends of the trough 57 which is supported on the lower platform level 12. A belt 58 extends from the sheave 25 driven by speed reducer 22 and this belt travels over a sheave 59 (Figure 2) mounted on shaft 61 which drives the end roller 56. Igniting flames are projected transversely across the burner conveyor 54 from burner jets 62 and 63. These two burner jets are supported by the side walls of the trough 57 and project their flames at the proper level and proper angle to ignite all of the gasoline wetted lint on the cotton seeds as the latter move along with the conveyor 54. The burner jets 62 and 63 are preferably supplied with ordinary illuminating gas and the operating relation is such that these flames will not in and of themselves apply any relatively high temperatures to the cotton seeds but will have as their primary or sole function to ignite the gasoline wetted lint on the seeds. The presence of continuously burning ignition flames at the burner jets 62 and 63 is desirable so that there will always be flash burning of the lint on the cotton seeds even though there might happen to be substantial intervals between the seeds that would not be bridged by flame propagation from one seed to another. The burners 62 and 63 are fed from suitable supply pipes 64 and 65 provided with suitable control valves. If illuminating gas is not available other combustible mediums may be employed, such as a vaporized hydrocarbon fuel, a fine gasoline spray or the like. Hence the burning of the lint on the seeds is more or less of a flash burning; the burning operation is completed in a relatively short travel of the conveyor 54. Disposed transversely above the left hand portion of this conveyor is a quenching pipe 68 having a multiplicity of small jet orifices 69 therein from which water is sprayed down on the conveyor belt 54. This fine water spray immediately quenches any residual lint which might continue to burn or smolder on the cotton seeds. Water is supplied to the spray pipe 68 through any suitable supply pipe 71 having an appropriate control valve therein. The excess spray water collects in a pan 73 disposed below the conveyor belt 54, and a return pipe 74 conducts this water to a drain or back to the pump or source of supply. The burner conveyor 54 may be composed of an asbestos fabric or other suitable textile, instead of a wire mesh, if desired.

The left hand end of the conveyor 54 discharges into a chute 76 which leads down through a hopper 77 into a two duct bagging unit 78, 78'. As shown in Figure 3, this bagging unit is adapted to deflect the cotton seeds alternatively through either duct 78, or 78' into bags 80 connected over the discharge mouth of either duct. A deflecting baffle or valve 81 can be positioned to direct the cotton seed through either duct 78 or 78', this being an arrangement well known in the art.

If desired, the rate of feed of the cotton seed from the feeding hopper 14 to the spray conveyor 16 can be regulated by any suitable baffle or valve, also well known in the art. The rate of travel of the conveyors 16 and 54 is regulated so that the seed will reach the burning zone defined by the burners 62 and 63 before a substantial amount of the inflammable liquid has evaporated from the lint. To obtain the desired flash burning of the lint in the aforesaid burning zone it is desirable that the lint be still wet with the inflammable liquid when the seed reaches this burning zone. If the operation has to be conducted under arid climatic conditions, or for other reasons, it may be desirable to condition the air immediately surrounding the machine so that this air will have a high humidty or water vapor content to retard evaporation of the inflammable liquid.

The invention is primarily intended for the delinting of cotton seed which is to be used for planting, but it also has utility for the delinting of cotton seed which is to be ground up or processed for the production of cotton seed oil and other by-products of cotton seed. Also, the invention can be employed for removing lint, fuzz or other surface material from other seeds as well.

While I have illustrated and described what I regard to be the preferred embodiment of my invention nevertheless it will be understood that such is merely exemplary and that numerous modifications and rearrangements may be made in the method and in the apparatus without departing from the essence of the invention.

I claim:

1. The method of delinting cotton seed which comprises spraying an inflammable liquid on the seed within a spray zone, immediately transferring the wet seed to a burning zone, and projecting a flame against the seed within this burning zone while the lint on said seed is still wet with said inflammable liquid so as to burn the lint off the seed.

2. The method of delinting cotton seed which comprises causing the seed to travel within a spray zone, spraying gasoline upon the seed while traveling in said spray zone, immediately transferring the wet seed to a burning zone and causing it to travel therein, projecting a flame against the seed while traveling in said burning zone and while still wet with said gasoline so as to burn the lint off the seed, and then projecting a quenching spray on the seed for quenching any residual lint on the seed which may continue to smolder or burn.

3. In apparatus for delinting seed, the combination of a first traveling conveyor adapted to receive the seed, means for spraying an inflammable liquid on said seed on the traveling conveyor, a second traveling conveyor adapted to receive the seed while still wet, means for igniting the seed on said second traveling conveyor for flash burning the wet lint off the seed, a transfer duct adapted to transfer the seed from said first conveyor to said second conveyor, and means for causing a relatively high velocity stream of air to flow through said duct toward said second conveyor whereby to prevent the propagation of flame from said second conveyor back to said first conveyor.

4. In apparatus for delinting seed, the combination of a spraying conveyor, means for discharging the seed on said spray conveyor, means for spraying an inflammable liquid over said seed on said spray conveyor, a burning conveyor, means for transferring the wet seed from said spraying conveyor to said burning conveyor, means for igniting the wet seed on said burning conveyor for burning the lint off the seed, means for causing a stream of gas to travel with the seed between said two conveyors at such velocity as to prevent the propagation of flame from said burning conveyor to said spray conveyor, and means for quenching the seed after the burning operation to quench any residual lint which may continue to burn or smolder.

5. In apparatus for delinting seed, the combination of a spraying conveyor, means for distributing the seed over said spraying conveyor, means for spraying inflammable liquid upon the seed while traveling on said spraying conveyor, a burning conveyor removed from said spraying conveyor, transfer means for transferring wet seed from said spraying conveyor to said burning conveyor, means for igniting the wet lint on the seed while traveling on said burning conveyor for burning the lint from the seed, means associated with said transfer means for causing a relatively high velocity stream of gas to travel in the same direction as the seed whereby to prevent flame propagation from said burning conveyor to said spraying conveyor, and quenching spray means for spraying water upon the seed while traveling on said burning conveyor so as to quench any residual lint which may continue to burn or smolder.

PRICE C. McLEMORE.

REFERENCES CITED

The following references are of record in the file of this patent:

UNITED STATES PATENTS

| Number | Name | Date |
| --- | --- | --- |
| 80,593 | Brown | Aug. 4, 1868 |
| 354,109 | Dudley | Dec. 14, 1886 |
| 564,398 | Templeton | July 21, 1896 |
| 822,478 | Rood | June 5, 1906 |
| 1,053,162 | Denney | Feb. 18, 1913 |
| 1,380,859 | Baker et al. | June 7, 1921 |
| 1,984,237 | Southan | Dec. 11, 1934 |
| 1,999,814 | Knight | Apr. 30, 1935 |
| 2,064,715 | Atwell | Dec. 15, 1936 |
| 2,166,974 | Shields | July 25, 1939 |